United States Patent [19]

Rutschmann

[11] Patent Number: 4,779,580
[45] Date of Patent: Oct. 25, 1988

[54] SUCTION SYSTEM FOR A RECIPROCATING PISTON INTERNAL COMBUSTION ENGINE

[75] Inventor: Erwin Rutschmann, Tiefenbronn, Fed. Rep. of Germany

[73] Assignee: Dr. Ing. h.c.F. Porsche Aktiengesellschaft, Fed. Rep. of Germany

[21] Appl. No.: 70,242

[22] Filed: Jul. 6, 1987

[30] Foreign Application Priority Data

Jul. 3, 1986 [DE] Fed. Rep. of Germany ....... 3622273

[51] Int. Cl.$^4$ .......................... F02B 29/02; F02M 9/12
[52] U.S. Cl. .............................. 123/52 MF; 123/336; 123/587
[58] Field of Search ................... 123/52 MF, 336, 337, 123/585, 586, 587

[56] References Cited

U.S. PATENT DOCUMENTS

| | | | |
|---|---|---|---|
| 3,857,375 | 12/1974 | Jackson | 123/587 |
| 3,935,842 | 2/1976 | Ishizawa et al. | 123/52 MF |
| 4,158,352 | 6/1979 | Blatter | 123/337 X |

Primary Examiner—Tony M. Argenbright
Attorney, Agent, or Firm—Barnes & Thornburg

[57] ABSTRACT

A suction system to an inlet valve of a reciprocating piston internal combustion engine consists of a suction line adapted to be closed by a closure valve and of a by-pass line by-passing the closure valve. A check valve is inserted into the by-pass line which is formed by slots in the suction line and spring lamellae covering the same from the outside. In order to reduce throttle losses and to permit a dynamic charging effect to become effective, the closure valve is fully opened at rotational speeds above 3,500 rpm.

13 Claims, 2 Drawing Sheets

SUCTION SYSTEM FOR A RECIPROCATING PISTON INTERNAL COMBUSTION ENGINE

SUMMARY AND BACKGROUND OF THE INVENTION

The present invention relates to a suction system for a fuel-air mixture to an inlet valve of a reciprocating piston internal combustion engine with a check valve in the suction line, an externally actuatable closure valve for the suction line and an injection nozzle.

Such a valve system is disclosed in the DE-OS No. 24 19 295. The suction line is closed at lower rotational speeds of the internal combustion engine, i.e., at low air velocities of the suction air by a rotatable closure valve. Within this rotational speed range, the air inlet takes place exclusively by way of a leaf spring valve installed into the closure valve and acting as check valve which is lifted off by the inflowing air from its valve seat and opens up a through-flow opening in the closure valve. In case of a return flow of the air, the leaf spring valve closes. It can thus be avoided that a part of the mixture introduced into the cylinder can be pushed back during the compression stroke into the suction line through the still open inlet valve and the filling of the cylinders is deteriorated thereby. In order to avoid an excessive throttling of the suction air at increasing rotational speeds, provision is made to rotate the closure valve into the open position by the throttle valve pivotally connected therewith. As only a relatively small opening cross section can be accommodated in the closure valve, the throttling nonetheless becomes relatively high so that the closure valve has to be opened already at rotational speeds at which a return flow of the sucked-in fuel/air mixture may still take place.

It is therefore the object of the present invention to provide a constructively simple and compact suction system in which the closure valve has to be opened only at higher rotational speeds of the internal combustion engine.

The underlying problems are solved according to the present invention in that the check valve is installed into a by-pass line by-passing the closure valve. If one installs the check valve into a by-pass line with respect to the closure valve, one is not limited by the size of the closure valve in dimensioning the through-flow cross section of the check valve. The through-flow cross section of the check valve can be dimensioned as large as the free cross section of the suction line so that the throttle losses can be reduced.

A particularly advantageous spatial arrangement results if the by-pass line consists of windows of the suction line covered off externally by spring lamellae and of bores adjoining the windows and extending at an acute angle to the suction line. In this case, nearly the entire circumferential surface of the suction line can be utilized as through-flow cross section. The by-pass flow of the closure valve branches off symmetrically upsream of the closure valve and terminates downstream thereof in the suction line so that no reason exists for a turbulence conditioned by asymmetry. A good mixing of the sucked-in air with fuel is served by this measure of arranging the injection nozzle at the suction line with the same angle as the bores of the by-pass lines so that its jet meets with the air bores of the by-pass line along the longitudinal axis of the suction line.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
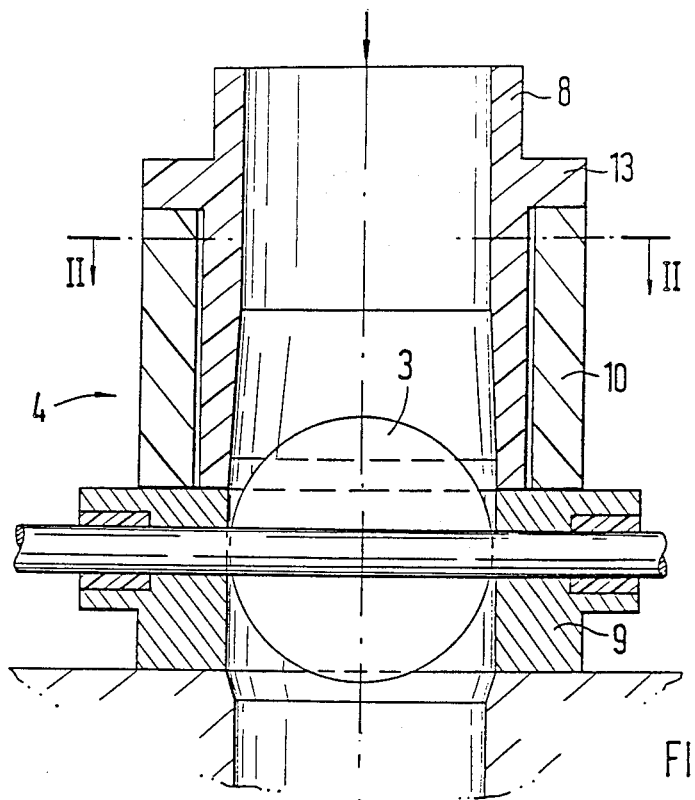
FIG. 1 is a longitudinal cross-sectional view through a suction line in accordance with the present invention, taken along line I—I of FIG. 2.
Figure 2:
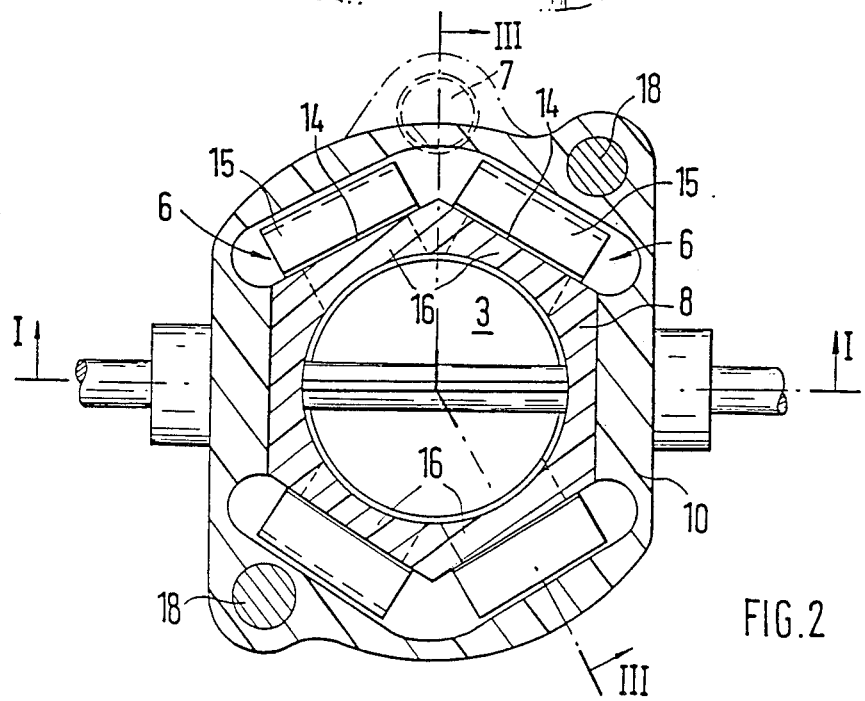
FIG. 2 is a transverse cross-sectional view through the suction line, taken along line II—II of FIG. 1.
Figure 3:
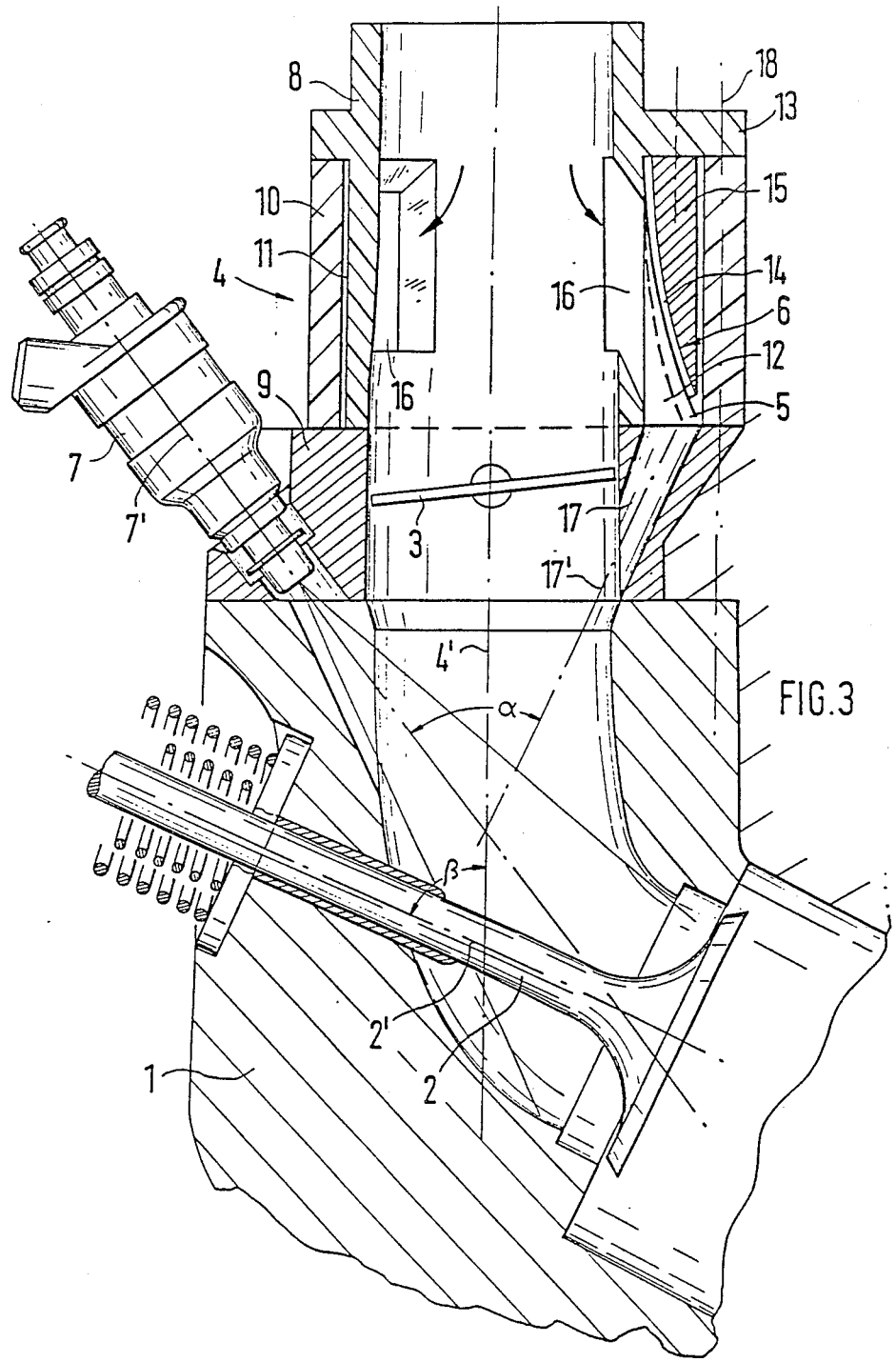
FIG. 3 is a longitudinal cross-sectional view through the suction line, taken along line III—III of FIG. 2.

Referring now to the drawing wherein like reference numerals are used throughout the various views to designate like parts, a suction system for a fuel/air mixture leads to an inlet valve 2 longitudinally guided in the cylinder head 1 of a reciprocating piston internal combustion engine, which consists of a suction line 4 adapted to be closed by a closure valve 3, of a by-pass line 5 with a check valve 6 and of an injection nozzle 7 for fuel. The suction line 4 is composed of a tubularly shaped lamellae support 8 and of a coaxial valve housing 9 with the same inner diameter in which the closure valve 3 is rotatably supported rotatable from the outside. A tubular member 10 is secured at the valve housing 9 which circumferentially surrounds the lamellae support 8 under formation of an annular gap 11 and of four pockets 12 arranged along its circumference and which is threadably secured at its flange 13. A spring lamella 14 is accommodated in each of the four pockets 12 which is shown in the opened, bent-open condition and thereby abuts at the curved contour of a filler member 15 which is flangedly connected at the lamellae support 8. During the return flow of the suction mixture, the spring lamellae 14 spring-back and close the windows 16 of the lamellae support 8. Bores 17 of the valve housing 9 adjoin the windows 16, which together with the windows 16 form the by-pass line 5.

The manufacture and assembly of the suction line is facilitated if it is assembled of plastic parts. The entire suction system is secured at the cylinder head 1 by means of two screws 18 at the flange 13.

The axes 17' of the bores 17 intersect along the longitudinal axis 4' of the suction line 4 in common with a longitudinal axis 7' of an injection nozzle 7 which is also secured at the valve housing 9 downstream of the closure valve 3. It is achieved therewith that the by-pass air meets with the injected fuel in the axial area of the suction line 4 and thus an intensive through-mixing of the fuel with the suction air is assured. The angle α between the axis 17' of the bores 17 and of the longitudinal axis 7' of the injection nozzle 7 disposed diametrally opposite thereto amounts to about 65°. It is approximately equally as large as the angle β which is formed by the longitudinal axis 2' of the inlet valve 2 with respect to the longitudinal axis 4' of the suction line 4.

In order to permit as small as possible a volume of the fuel-air mixture to flow back out of the cylinder head 1, the closure valve 3 and the check valve 6 formed by the spring lamellae 14 and window 16 is arranged as close as possible to the cylinder head 1. The filler members 15 also have the purpose to leave as little space as possible to the return flowing mixture.

In the lower rotational speed range of the internal combustion engine, the closure valve 3 is closed. The air flows into the cylinder head 1 by way of the slots 16 and the bores 17. With increasing rotational speed of the internal combustion engine, the air velocity increases evermore, the spring lamellae bend outwardly until they abut at the filler members. In order to keep small the throttle losses, the closure valve is automatically opened at a rotational speed of the internal combustion engine of about 3,500 rpm and remains open up to the maximum rotational speed. Within this rotational speed range, no return flow of the mixture takes place any longer. The opening of the closure valve favors the dynamic charging effect which occurs at that point.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A suction system for a fuel-air mixture to an inlet valve longitudinally guided in a cylinder head of an internal combustion engine, comprising a suction line, check valve means in the suction line, closure valve means for the suction line which is operable to be actuated from the outside, and an injection nozzle, the check valve means being inserted into a by-pass line means by-passing the closure valve means, wherein the branching location of the by-pass line means includes several through-passing windows in the suction line which are so covered by spring lamellae secured externally at the suction line that the spring lamellae open up the windows by a resilient bending open movement during the forward flow of the suction air and close the same during a return flow.

2. A valve system according to claim 1 wherein the by-pass line means branches off from the suction line directly upstream of the closure valve means and terminates in the suction line directly downstream of the closure valve means.

3. A suction system according to claim 1, wherein the suction line comprises a tubularly shaped lamellae support means, a valve housing means coaxially flangedly connected at the lamellae support means for the rotatable bearing support of the closure valve means, and a tubular member secured of the valve housing means and circumferentially surrounding the lamellae support means to form pockets for the spring lamellae.

4. A suction system according to claim 3, wherein the spring lamellae abut in the open position at the contours of filler members matched to their bending configuration.

5. A suction system according to claim 3, wherein the by-pass line means consists of several windows distributed substantially symmetrically along the circumference of the lamellae support means and of bores of the valve housing means extending at an acute angle to the longitudinal axis of the suction line and adjoining said windows 6. A suction system according to claim 5, wherein the injection nozzle is secured at the valve housing means downstream of the closure valve means.

7. A suction system according to claim 6, wherein the longitudinal axis of the injection nozzle and the axes of the bores intersect along the longitudinal axis of the suction line.

8. A suction system according to claim 7, wherein the angle between the axes of the bores and the injection nozzle is approximately equal to the angle between the longitudinal axis of the suction line and the longitudinal axis of the inlet valve.

9. A suction system according to claim 1, wherein the closure valve means is controlled by the rotational speed of the internal combustion engine and is fully opened at rotational speeds above about 3,500 rpm 10. A suction system according to claim 3, wherein the injection nozzle is secured at the valve housing means downstream of the closure valve means.

11. A suction system according to claim 5, wherein the longitudinal axis of the injection nozzle and the axes of the bores intersect along the longitudinal axis of the suction line.

12. A suction system according to claim 11, wherein the angle between the axes of the bores and the injection nozzle is approximately equal to the angle between the longitudinal axis of the suction line and the longitudinal axis of the inlet valve.

13. A suction system according to claim 12, wherein the closure valve means is controlled by the rotational speed of the internal combustion engine and is fully opened at rotational speeds above about 3,500 rpm.

* * * * *